United States Patent [19]
Christy

[11] Patent Number: 5,319,021
[45] Date of Patent: Jun. 7, 1994

[54] ORGANOSILICONE COMPOSITION

[76] Inventor: George M. Christy, 2108 Raven Rd., Pleasanton, Calif. 94566

[21] Appl. No.: 885,153

[22] Filed: May 18, 1992

Related U.S. Application Data

[63] Continuation-in-part of Ser. No. 607,829, Nov. 1, 1990, abandoned.

[51] Int. Cl.$^5$ .............................................. C08L 85/00
[52] U.S. Cl. .................................. 524/857; 525/478; 525/477; 528/10; 528/25; 528/5; 528/8
[58] Field of Search .................. 525/478, 477; 528/10, 528/25, 5, 8; 524/857

[56] References Cited

U.S. PATENT DOCUMENTS

| | | | |
|---|---|---|---|
| 2,541,851 | 2/1951 | Wright | 524/860 |
| 3,146,799 | 9/1964 | Fekete | 138/125 |
| 3,194,680 | 7/1965 | Damm et al. | 117/155 |
| 3,350,344 | 10/1967 | Beers | 524/860 |
| 3,677,997 | 7/1972 | Kaiser et al. | 524/588 |
| 3,855,171 | 12/1974 | Wegehaupt et al. | 260/37 SB |
| 4,742,142 | 5/1988 | Shimizu et al. | 524/862 |
| 4,880,882 | 11/1989 | Morita et al. | 524/861 |
| 5,028,653 | 7/1991 | Desmonceau et al. | 524/462 |

FOREIGN PATENT DOCUMENTS 63-270769  11/1988  Japan ..................... 528/5

Primary Examiner—Melvyn I. Marquis
Assistant Examiner—Karen A. Dean
Attorney, Agent, or Firm—Philip D. Junkins

[57] ABSTRACT

Bouncing putty type polysiloxane-boron compounds are modified with the homogeneous addition of from about 1% by weight to about 60% by weight of discrete elastic particles of natural rubber or synthetic rubber to yield an improved putty-like organopolysiloxane-boron composition which exhibits both bounce elasticity and stretch elasticity with the ability of the composition to recover to its initial form when a deforming stress is removed.

The modified polysiloxane-boron material has specific uses in exercising and physical therapy applications.

9 Claims, No Drawings

ORGANOSILICONE COMPOSITION

This is a continuation-in-part of my co-pending application Ser. No. 07/607,829 filed Nov. 1, 1990, now abandoned.

BACKGROUND OF THE INVENTION

The present invention relates to an improved polysiloxane-boron composition and more particularly to the addition of elastomeric polymers to polysiloxane-boron compositions having only recovering bounce elasticity to provide new compositions having both bounce elasticity and recovering stretch elasticity.

A group of polysiloxane-boron compounds displaying bounce elasticity have been widely known in commercial markets and products forms. This type of material is often referred to as bouncing putty. The viscosity of such material ranges from very high to very low. Medium viscosity forms of polysiloxane compounds displaying bounce elasticity are marketed as toys such as "Silly Putty" (TM) or "Wacky Putty" (TM). These materials can be easily molded or shaped into unique shapes or forms. Unlike the more common molding clays and molding doughs, these polysiloxane-boron materials do not dry out and become hard and brittle over time. Instead, they retain their plasticity, moldability or flexibility indefinitely.

The use of low to medium viscosity forms of polysiloxane-boron compounds is well known in the physical therapy field. In physical therapy applications these compounds are used in a dough-like form as a medium for muscle exercise. The material is pulled, stretched and kneaded to aid particularly in the rehabilitation of hand and arm muscles. The use of such materials for therapy applications is noted in U.S. Pat. No. 3,677,997. In U.S. Pat. No. 2,541,851 polysiloxane-boron compounds or bouncing putties are described as having the property of high bounce elasticity under suddenly applied compression stress and a high degree of plasticity when such stress is applied slowly. Further, in U.S. Pat. No. 3,350,344 the properties of organosilicone putty in general are described as being resilient and deformable.

The compositions of the prior art polysiloxane-boron compounds have not provided materials which have significant stretch elasticity or stretch recovery properties. These elasticity properties are indicated by the ability of a material to return to its original form after having been stretched, molded or shaped.

References in the literature show that the known polysiloxane-boron compounds behave as a liquid plastic material through the range of low to high viscosities. Thus, the liquid plastic state-of-the-art base putty materials must be physically reshaped after exposure to a slowly applied stretching stress before they can be similarly stretched again. In physical therapy applications, this property of inelastic stretch (inelastic stretch recovery) in the known polysiloxane-boron compounds results in ineffective therapy. It follows that ineffective therapy generally requires the prescription of additional therapy regimes at additional expense and cost of time to the patient.

The compositions of the prior art polysiloxane-boron materials have not provided a class of materials displaying stretch elasticity or stretch recovery properties after elastic stretching thereof. It is therefore a principal object of the present invention to overcome such deficiencies of known polysiloxane-boron compounds and provide a bouncing putty type material which displays both bounce elasticity (compression stress recovery) and stretch elasticity (stretch stress recovery).

SUMMARY OF THE INVENTION

The present invention relates to an improved class of polysiloxane-boron compounds. The improved compounds of this class are comprised of base polysiloxane-boron compounds, commonly referred to as "bouncing putties" (display bounce elasticity), to which has been added 1% to 60% by weight of discrete elastic particles of natural rubber or synthetic rubbers (particulate elastomeric polymers) with the result that the improved compounds display both bounce elasticity (compression stress recovery) and stretch elasticity (stretch stress recovery). As a preferred aspect of the invention a particulate elastomeric polymer in an amount of 2% to 15% by weight is added to the base polysiloxane-boron compounds. An example of a base polysiloxane-boron compound classified as a bouncing putty is Silicone Q2-3233 (marketed by Dow Corning Corporation) which consists of a mixture of polydimethyl-siloxane, dimethyl cyclosiloxane, glycerine, boric acid and amorphous silica.

The elastomeric polymer utilized may be the product of:
a) the unreacted single component compounds
  i) silica reinforced dimethyl, methyl vinyl siloxane copolymer containing a platinum catalyst and
  ii) silica reinforced dimethyl, methyl vinyl siloxane copolymer containing a silane crosslinker,
  with such siloxane copolymers being independently introduced to the base polysiloxane-boron compound, admixed therewith, and cured to particulate form therein, or
b) pre-reacted (cured) mixtures of such single component siloxane copolymers introduced to the base polysiloxane-boron compound and admixed therewith.

An example of an elastomeric polymer is the product of Silastic Q7-4720A and Silastic Q7-4720B (both marketed by Dow Corning Corporation). Q7-4720A is a silica reinforced dimethyl, methyl vinyl siloxane copolymer containing a platinum catalyst and Q7-4720B is a silica reinforced dimethyl, methyl siloxane copolymer containing a silane crosslinker.

The improved class of polysiloxane-boron compounds formed in accordance with the invention can be tailored to retain the desired bounce elasticity characteristics of known bouncing putties while displaying unique stretch elasticity and recovery characteristics after elongation stress deformation.

DETAILED DESCRIPTION OF THE INVENTION

The improved putty-like organosilicone compounds of the present invention uniquely exhibit both bounce elasticity and stretch elasticity. They are comprised of known base polysiloxane-boron compounds, commonly referred to as bouncing putties, to which have been added and admixed 1% to 60% by weight of: a) two unreacted single component elastomeric polymers which cure upon admixture within the base compounds and form discrete elastic particles therein, or b) pre-reacted (cured) mixtures of such single component polymers forming discrete elastic particles which are admixed with the base compounds. The known base polysiloxane-boron compounds are a unique class of materials based on linear diorganopoly-siloxanes and boron compounds.

The base putty-like polysiloxane-boron compounds can contain filler materials. The filling materials serve the purpose of increasing the viscosity of the base materials. The degree of viscosity increase is not due to the amount of filler material added but also the particle size of the filler material. In the case of silica filler, for example, it has been found that the addition of 50% by weight of ground silica with a particle size of 5 microns yields approximately the same viscosity increase in the base materials as the addition of 10% by weight submicron sized fumed silica. Fillers also tend to lower the overall cost of the improved putty-like organosilicone compounds of the invention. The filler materials can be added in the range of 1% to 60% by weight of the putty-like base polysiloxane-boron compounds. In addition to silica, some examples of other fillers useful in the invention are talc, calcium carbonate, wood flour, titanium dioxide, cotton flock, clay, bentonite, zinc hydroxide and barium sulfate, and combinations thereof.

Softeners can also be added to the putty-like base polysiloxane-boron compounds and serve the primary purpose of decreasing the viscosity of the base compounds. They can be added to the base compounds in the range of 1% to 30% by weight based on the viscosity reduction efficiency of such compounds. Examples of softeners useful in the invention are oleic acid, silicone oils and glyceryl oleate and combinations thereof. The putty-like base polysiloxane-boron compounds can contain fillers or softeners or fillers and softeners. As is already known in the bouncing putty art, fillers and softeners are used to modify the viscosity of the base putty-like material but they contribute no elastomeric recovery properties to the base polysiloxane-boron compounds.

The addition of particulate elastomeric polymers to the putty-like base polysiloxane-boron compounds (bouncing putties), in accordance with the present invention, results in the distinct imparting of elastic recovery (stretch elasticity) properties to such filled or unfilled base compounds. The degree of stretch elastic recovery imparted to the base compounds can be tailored to such compounds by adding varying amounts of the particulate elastomeric materials. As previously indicated, the particulate elastomeric materials may be comprised of two unreacted single component elastomeric polymers which cure upon admixture within the base polysiloxane-boron material or such particulate elastomeric materials may be comprised of pre-reacted (cured) mixtures of such single component elastomeric polymers which are, after curing, admixed with the base polysiloxane-boron material. Examples of the particulate elastomeric materials utilized in the invention are shown in the product examples set forth hereinafter. At a given base compound viscosity, the stretch elastic properties (and corresponding elastic recovery rate) of the improved polysiloxane-boron compositions increase as the amount of elastomeric material is added.

Standard test methods for measuring the stretch elasticity and elastic recovery properties of known organosiloxane-boron putties, and particularly the improved organosiloxane-boron compounds (containing particulate elastomeric polymers) of the invention, have not been developed as readily available reference tests. Therefore, a comparative test methodology was devised to determine the elastic recovery rate of putty-like organosiloxane-boron compounds (both of known and improved composition) after 100% elongation. Forty grams of each putty-like material was formed into a two inch long rod. Each rod was then elongated (stretched) to four inches and folded in half back upon itself. This procedure was repeated two additional times and then elongated to the four inch length a fourth time. After the fourth elongation, each rod was released onto a glass surface which had been lubricated with petrolatum. The change (reduction) in length of each rod from the original four inches was measured 20 seconds after the release and was recorded as a percentage of the original length. A recording of 0% recovery indicates that the putty-like material stayed at the elongated (stretched) length of four inches and has no elastic recovery property. A recording of 100% recovery indicates that the putty-like material has fully recovered to the original two inch length. The extension of elapsed time between release and length measurement of test rods of the putty-like materials is used to study the time variable as it relates to degree or percentage of recovery.

A practical means of evaluating the bounce elasticity (compression stress recovery) and stretch elasticity (stretch stress recovery) properties of a polysiloxane-boron putty-like material is to mimic the actual therapeutic use of such material. To accomplish this, each to-be-compared material is grasped with both hands and pulled apart approximately 6 to 8 inches and then folded back upon itself. This process is repeated ten times for each material. This comparative evaluation method shows the distinct differences between state-of-the-art organosiloxane-boron putties and the improved putties of the present invention. Thus, tensile strengths of the to-be-compared materials is determined by the relative force needed to pull each material to the extended length. State-of-the-art putties require a high initial pulling force to elongate the materials (indicates high tensile initial strength of the materials). After repetitive pulling such materials reach a constant tensile strength or pulling force which is significantly less than that which is originally required to elongate the materials. Under the same pulling conditions, the improved putty-like organosiloxane-boron compounds which contain the particulate elastomeric materials, in accordance with the invention, not only display unique elastic recovery properties but also have a unique tensile strength resistance profile. They require a high initial pulling force (indicates high tensile strength) to accomplish their elongation. After repetitive stretching the elastomer-modified putties also require lesser pulling force to effect their elongation. However, with a continued pulling and folding action the improved organosiloxane-boron compounds demonstrate the unique characteristic of requiring a tensile pulling force which is greater than the initial pulling force. Thus, with the improved organosiloxane-boron (polysiloxane-boron) compounds of the invention repeated pulling and folding action unexpectedly increases the tensile pulling force required to further pull manipulate the materials and thereby provides in such materials substantial advantage in their use for physical therapy applications.

Table I below provides a comparison of: The properties (Column A) of state-of-the-art base organosiloxane-boron putty-like material (Dow Corning Q2-3233 Bouncing Putty), and the properties (Column B) of the same base putty-like material to which was added and admixed 5% by weight of particulate silicone elastomers (the cured product of Dow Corning Silastic Q7-

4720A and Silastic Q7-4720B) in accordance with the present invention.

TABLE I

| A. State-of-the-Art Organo-siloxane Bouncing putty | B. Improved Bouncing Putty with Siloxane Elastomers |
|---|---|
| 1. Putty bounces | 1. Putty bounces |
| 2. Viscosity increases with increasing filler content | 2. Viscosity increases with increasing filler content |
| 3. Tensile strength increases with increasing filler content | 3. Tensile strength increases at a faster rate with increasing filler content |
| 4. Loss of 50% to 80% of initial viscosity after cyclic stretching | 4. Loss of 50% to 80% of initial viscosity after cyclic stretching |
| 5 Loss of 50% to 80% of tensile strength after cyclic stretching | 6. Loss of 20% to 50% of tensile strength after cyclic stretching |
| 6. After initial high tensile strength value the tensile strength falls to a constant while being cyclically stretched and folded | 6. After initial high tensile strength value the tensile strength falls below the initial value and then exceeds the initial value while being cyclically stretched and folded |
| 7. Putty maintains shape or slowly slumps after after distortion | 7. Putty immediately attempts to return to its original dimension after distortion |

Elastomeric materials which can be added to the base putty-like oganosiloxane-boron compounds in accordance with the invention are polymeric and oligomeric particulate materials which exhibit the property of returning to their original shape after having been forcefully stretch deformed. These include natural rubber and synthetic rubber.

At a given percentage of the particulate elastomeric materials to the base putty-like organosiloxane-boron compounds, the elastic stretch recovery properties were found to not only depend on the percentage of such materials added but also on the particle size and the specific compositions of the elastomeric materials. The effective range of particle size of the elastomeric materials was found to be 0.1 millimeter to 0.01 millimeter in particle cross section dimension or diameter. The upper limit of effective particle size was dictated by the physical characteristics of the base putty remaining lumpy or non-homogeneous after the addition of the elastomeric particles. The lower limit of effective particle size was found to be dictated by the detection of the improved base putty-like material beginning to lose its desired elastic recovery characteristics.

The exact mechanism whereby the addition of discrete particles of elastomeric materials to the base polysiloxane-boron putty material results in the material having elastic recovery characteristics, is unknown. However, it is theorized that when the putty mass containing particulate elastomeric polymer is manipulated, stretched or otherwise has an external force applied to it, the elastomeric particles experience elastic stretch. When the manipulation of the putty-like material ceases, the elastomeric particles attempt to return to their original profile. It appears that the elastomeric particles can return to their original profile only by also moving that putty-like material that is in close proximity to each of the elastomeric particles. As the concentration of elastomeric particles added to the base putty material increases, the translation of distortion to the elastomeric particle increases and therefore the amount of putty base affected during the recovery increases. Furthermore, the internal friction level of the base putty-like material and also any fillers which may have been added, improves both the translation of distortion to the elastomeric particles and it increases the affected mass of the putty-like material during recovery.

As previously indicated, the particulate elastomeric polymer material added to the base putty-like polysiloxane-boron compound to form the improved polysiloxane-boron compound can be a single component non-reactive (cured) particulate silicone elastomer formed by pre-reacting a first dimethyl, methyl vinyl siloxane copolymer containing a platinum catalyst with a second dimethyl, methyl vinyl siloxane copolymer containing a silane crosslinker. Alternatively, the particulate elastomeric polymer material added to the base polysiloxane-boron compound can be the product of the aforementioned first siloxane copolymer containing platinum catalyst material admixed with a first portion of the base compound and the aforementioned second siloxane copolymer containing silane crosslinker material admixed with a second portion of the base polysiloxane-boron compound, with the resulting first and second portions of such base compound thereafter admixed whereby the first and second siloxane copolymers are reacted together (cured) within the base polysiloxane-boron material to form the desired particulate elastomeric polymer material thereby to form the improved putty-like polysiloxane-boron material displaying both bounce elasticity (compression stress recovery) and stretch elasticity (stretch stress recovery). The following examples are presented to set forth actual mixtures of base putty-like polysiloxane-boron compounds (state-of-the-art bouncing putties) and particulate elastomeric material to form the improved materials of the invention.

EXAMPLE I

Three grams each of a two part elastomeric polymer system marketed by Dow Corning Corporation as a) Silastic Q7-4720A (silica reinforced dimethyl, methyl vinyl siloxane copolymer containing a platinum catalyst) and b) Silastic Q7-4720B (silica reinforced dimethyl, methyl vinyl siloxane copolymer containing a silane crosslinker) were pre-reacted to yield a non-reactive single component fully polymerized (cured) particulate elastomer. This particulate non-reactive single component elastomeric polymer was mixed with 94 grams of a polysiloxane-boron compound marketed as "Thera-Putty" (TM) by North Coast Medical, Inc. The polysiloxane-boron material containing the polymerized elastomeric compound was worked into a smooth homogeneous mixture on a two roll mill until the polymerized elastomer was milled to a particle size of between 0.1 millimeter and 0.01 millimeter. The improved putty-like material of this example displayed the properties and characteristics as set forth hereinafter in Table II.

EXAMPLE II

Seventy-five grams of polysiloxane-boron elastomer, marketed by Dow Corning Corporation as Q2-3233 Bouncing Putty, was mixed with 75 grams of ground silica and milled on a two roll mill to a smooth homogeneous mixture. Separately, 25 grams of reactive polymeric material designated as Dow Corning Silastic Q7-4720A was mixed with 25 grams of reactive polymeric material designated as Dow Corning Silastic Q7-4720B.

The polysiloxane-boron compound containing the silica was then milled with the 50 grams of elastomeric polymer material on a two roll mill until a homogeneous mixture was achieved. The mixture was then removed from the mill and transferred to an oven and cured for 2 hours at 163 degrees C. The cured mixture was allowed to cool and 48 grams of such mixture was milled on a two roll mill into 152 grams of a 50—50 mixture by weight of Q2-3233 Bouncing Putty and ground silica. Three grams of oleic acid was added to the final mixture to reduce the putty viscosity. The improved putty-like material of this example displayed the properties and characteristics as set forth hereinafter in Table II.

EXAMPLE III mixture A ; Ten grams of Kraton 1650 styrene ethylene butylene styrene block copolymer made by Shell Chemical Co. was combined with 20 grams of mineral oil and 20 grams of Regalrez 1018 hydrogenated hydrocarbon resin made by Hercules Chemical Co. The mixture was heated until clear while mixing at 155 degree C. The mixture (Mixture A) was maintained at a temperature between 120 degree C. and 160 degree C.

Mixture B: Four hundred grams of Dow Corning Q2-3233 Bouncing Putty was mixed with 400 grams of ground silica. The mixture (Mixture B) was milled on a two roll mill until homogeneous.

On the two roll mill Mixture A was combined with Mixture B until the final mixture was homogeneous. The final mixture was allowed to cool and 10 grams of oleic acid was added thereto to reduce the viscosity of the resulting improved putty-like material. the improved putty-like material of this example displayed the properties and characteristics as set forth hereinafter in Table II.

EXAMPLE IV

Mixture C: Five grams of Dow Corning Silastic Q7-4720A was blended with 10 grams of Dow Corning Silastic Q7-4720B.

Mixture D: One hundred and eighty-five grams of polysiloxane-boron with 0.13 mole % vinyl groups was formulated by reacting 175 grams of Dow Corning Silicone Q4-2735 (vinyl terminated organosiloxane gum ) with 10 grams of pyroboric acid at 155 degree C. in the presence of ferric chloride. The reaction was neutralized with ammonium carbonate and the resulting material was milled on a two roll mill with 160 grams of ground silica until mixture (Mixture D) was homogeneous.

Mixture C was combined with Mixture D and heated to 155 degree C. for 2 hours. The final mixture was allowed to cool and then milled on a two roll mill until the final mixture was homogeneous. Five grams of oleic acid was added to reduce the putty viscosity. The improved putty-like material of this example displayed the properties and characteristics as set forth hereinafter in Table II.

EXAMPLE V

Ten grams of "Tub and Tile Caulk" polyvinyl acetate caulking compound made by Darworth Co. was combined with 45 grams of Dow Corning Q2-3233 Bouncing Putty and 45 grams of ground silica. The mixture was allowed to air dry at room temperature for 24 hours and then it was milled on a two roll mill until homogeneous. One gram of oleic acid was added to reduce the resulting putty. The improved material displayed the properties and characteristics as set forth hereinafter in Table II.

The elastomeric polymer modified bouncing putties from Examples I through V determined to be of approximately the same viscosity. Table II presents a comparison of the properties and characteristics of the improved putty formulations from the examples vs. the same properties and characteristics of the state-of-the-art (commercially available) Medium Grade "Thera-putty" (TM) and "Silly Putty" (TM). In each case the putty was pre-stretched a sufficient number of times to reduce the initial viscosity of the material. The cohesive character of a putty that allows it to fuse together after extensive deformation is termed "moldability". For comparative purposes the state-of-the-art Medium Grade "Thera-putty" was assigned the standard figure for moldability of 100%.

TABLE II

|  | Moldability | 20 Second Recovery | 60 Second Recovery | Rel. Tens. Force After 10 Cycles |
|---|---|---|---|---|
| Med. Grd. Thera-Putty | 100% | 0% | 0% | 0% |
| Silly Putty | 100% | 0% | 0% | 0% |
| Example I | 100% | 50% | 75% | 150% |
| Example II | 100% | 65% | 85% | 250% |
| Example III | 90% | 80% | 92% | 300% |
| Example IV | 85% | 65% | 75% | 200% |
| Example V | 50% | 85% | 88% | 200% |

From the moldability percent, recovery percent and relative tensile force percent figures presented in Table II for state-of-the-art bouncing putties (Thera-Putty and Silly Putty) vs. such figures for the improved putty-like materials of the present invention, it is apparent that the improved putty-like polysiloxane-boron materials including particulate elastomeric polymers (Example I-V) uniquely exhibit substantial stretch elasticity (stretch stress recovery) properties while maintaining relatively high levels of bounce elasticity (compression stress recovery) properties.

Although the present invention has been described in detail with respect to certain preferred embodiments thereof, it is to be understood by those skilled in the art that variations and modifications of such embodiments may be made without any departure from the spirit and scope of the following claims.

What I claim is:

1. An improved deformable solid putty organopolysiloxane-boron composition which exhibits both bounce elasticity and stretch elasticity comprising a bouncing putty polysiloxane-boron compound which includes in homogeneous admixture therewith elastic particles which impart stretch elasticity to the composition, wherein the elastic particles are selected from the group consisting of natural rubber particles and synthetic rubber particles, and wherein the elastic particles comprise from about 1% by weight to about 60% by weight based on 100% by weight of said improved composition.

2. The improved deformable solid putty organopolysiloxane-boron composition as claimed in claim 1 wherein the elastic particles are present in the amount of from about 2% by weight to about 15% by weight based on 100% by weight of said composition.

3. The improved deformable solid putty organopolysiloxane-boron composition as claimed in claim 1 further comprising filler material to increase the viscosity of the polysiloxane-boron compound, wherein the filler material is present in the amount of from about 1% by weight to about 60% by weight based on 100% by weight of said composition.

4. The improved deformable solid putty organopolysiloxane-boron composition as claimed in claim 3 wherein the filler material is selected from the group consisting of silica, talc, calcium carbonate, wood flour, titanium dioxide, cotton flock, clay, bentonite, zinc hydroxide, barium sulfate, and combinations thereof.

5. The improved deformable solid putty organopolysiloxane-boron composition as claimed in claim 1 further comprising softener material to decrease the viscosity of the polysiloxane-boron compound, wherein the softener material is present in the amount of from about 1% by weight to about 30% by weight based on 100% by weight of said composition.

6. The improved deformable solid organopolysiloxane-boron composition as claimed in claim 5 wherein the softener material is selected from the group consisting of oleic acid, silicone oils and glyceryl oleate, and combinations thereof.

7. An improved deformable solid putty organopolysiloxane-boron composition as claimed in claim 1 wherein the particle size range of the elastic particles in homogeneous admixture with said polysiloxane-boron compound is from about 0.1 millimeter to about 0.01 millimeter.

8. The improved deformable solid putty organopolysiloxane-boron composition as claimed in claim 1 wherein the elastic particles are synthetic rubber particles produced by reacting, prior to adding the particles to the polysiloxane-boron compound, a mixture of (i) a silica reinforced dimethyl, methyl vinyl siloxane copolymer containing a platinum catalyst; and (ii) a silica reinforced dimethyl, methyl vinyl siloxane copolymer containing a silane crosslinker.

9. The improved deformable solid organopolysiloxane-boron composition as claimed in claim 1 wherein the elastic particles in homogeneous admixture with said polysiloxane-boron compound are synthetic rubber particles comprised of (i) silica reinforced dimethyl, methyl vinyl siloxane copolymer containing a platinum catalyst and (ii) silica reinforced dimethyl, methyl vinyl siloxane copolymer containing a silane crosslinker reacted together within said polysiloxane-boron compound.

* * * * *